June 19, 1934.  L. J. GRUBMAN  1,963,129
DOLL'S EYE
Filed Aug. 26, 1931  2 Sheets-Sheet 1
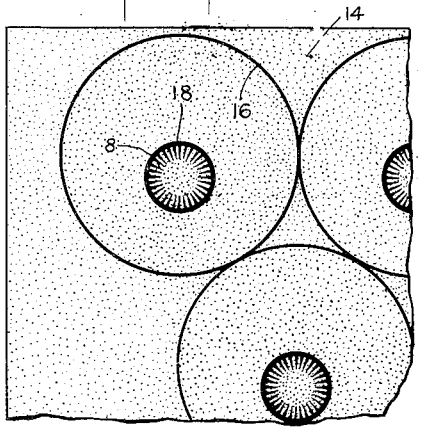
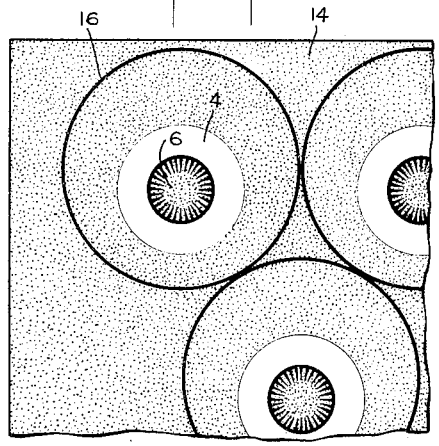
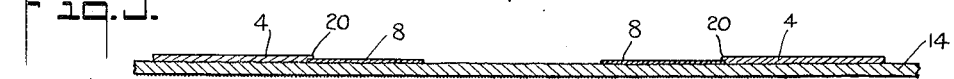
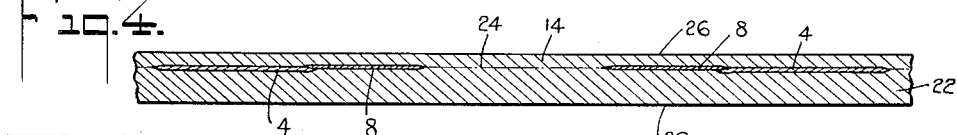
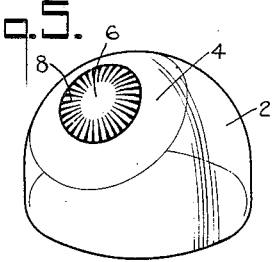
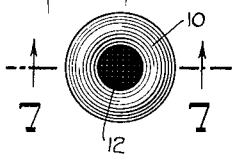
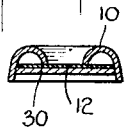
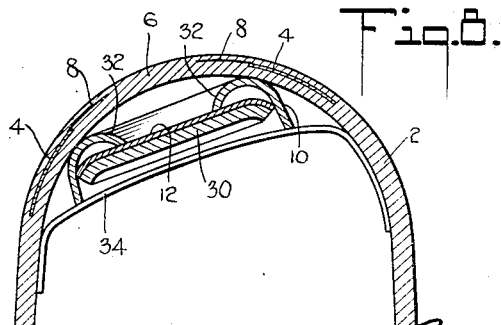
INVENTOR
Leo J. Grubman
BY
ATTORNEYS June 19, 1934.  L. J. GRUBMAN  1,963,129
DOLL'S EYE
Filed Aug. 26, 1931   2 Sheets-Sheet 2
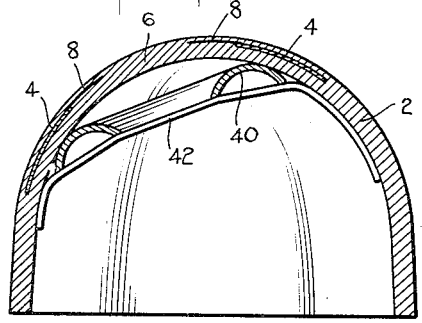
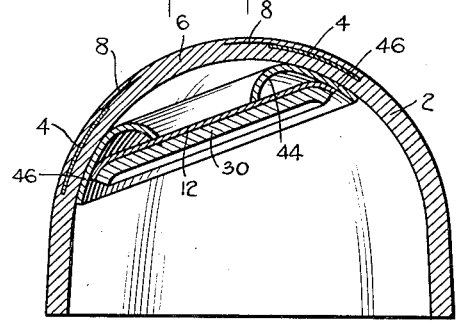
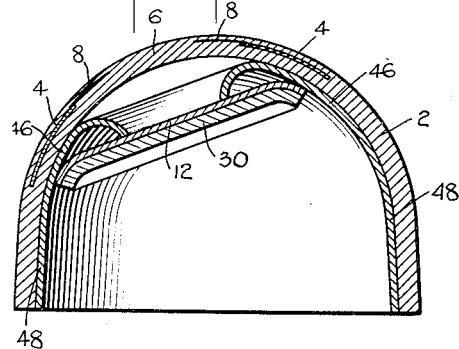
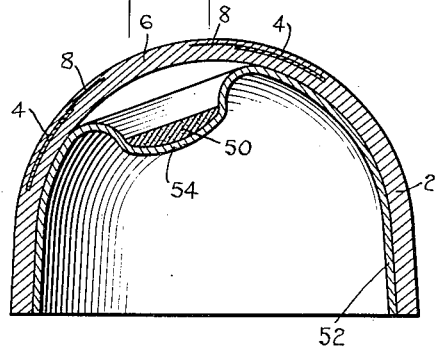
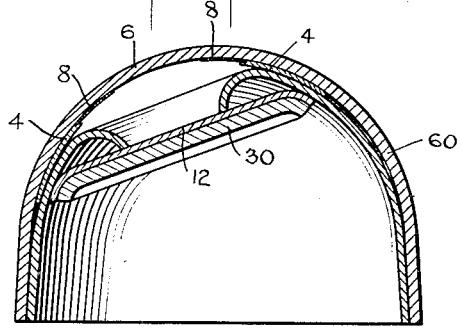
INVENTOR
Leo J. Grubman
BY
ATTORNEYS

Patented June 19, 1934

1,963,129

UNITED STATES PATENT OFFICE 1,963,129

DOLL'S EYE

Leo J. Grubman, Belle Harbor, N. Y., assignor to Margon Corporation, New York, N. Y., a corporation of New York Application August 26, 1931, Serial No. 559,386

26 Claims. (Cl. 46—40)

This invention relates to dolls' eyes, and more particularly to an imitation glass eye and method of making the same.

Dolls are frequently provided with movable eye shells, and the more expensive dolls are sometimes provided with glass eyes because of the realistic manner in which such eyes simulate a real or natural eye. Because of the expense of these glass eyes, considerable work has been done in an effort to produce an imitation glass eye made of celluloid or like readily workable material. The primary objects of the present invention center about the production of an imitation glass eye which will rival or even surpass a real glass eye in depth nad realism, and which at the same time may be manufactured with a convenience and economy even greater than is the case with other and relatively inferior imitation glass eyes heretofore known.

More specifically, one object of the present invention is to simplify the mode of obtaining the radial lines ordinarily provided about the iris of the eye, and at the same time to secure an apparent depth of eye. To this end I provide an eye shell having a transparent circular portion corresponding to the iris of the eye, which I provide with radial lines in a very simple manner, as by printing the same directly on the transparent material, and I further provide the iris of the eye with an appropriately colored annular background which is spaced rearwardly a substantial distance from the eye shell with its radial lines. The radial lines and the background are both visible through the transparent portion of the shell, but the relative displacement of the same rearwardly of the shell creates an appearance of depth in the eye. The background may, of course, further include a dark central portion simulating the pupil of the eye and this portion is also spaced a substantial distance rearwardly of the eye shell and preferably also rearwardly of the background of the iris of the eye.

In accordance with a further feature and object of the present invention, the background is itself so shaped as to very greatly increase the apparent depth of the eye, and to this end the background of the eye is provided by means of an inner member which is affixed within the eye shell behind the transparent portion. This inner member is appropriately shaped to include the pupil of the eye which is set rearwardly of the shell a substantial distance, and a colored annular surface surrounding the pupil of the eye and extending forwardly and outwardly from the rearwardly set pupil of the eye to the periphery of the transparent portion or iris portion of the shell with an outwardly convex or horn-like expansion. The outwardly convex cross section of the annular iris portion of the inner member gives the same a curvature which diverges inwardly away from the eye shell and toward the pupil of the eye, and this, I find, effectively creates an appearance of depth. This apparent depth exists even in the absence of the radial lines previously described, but the combination of both features is extremely effective and seems to emphasize the depth of the eye by reason of the spacing therebetween.

Still another object of the present invention is to make it readily possible to provide eyes of desired color. I have found that the radial lines on the eye shell may all be printed of a single uniform color which preferably is a relatively neutral color such as a grayish blue. The inner members are appropriately colored in accordance with the desired color of eye, so that the desired shades of color need only be provided on the inner members.

In studying artificial eyes, I have discovered that many lack realism because of reflection of light from the pupil of the eye. The pupil is a dark central portion and has heretofore been provided by applying a black paint or ink at the desired portion of the eye. I have found that the black surface employed should be non-reflecting or fully absorptive to light. Accordingly, still another object of the present invention is to provide the pupil of the eye with a non-reflecting dark or black surface, and to this end I have found that the desired result may best be obtained by utilizing a surface of black fabric. This in turn is most readily applied by cutting an aperture through the inner member at the pupil of the eye, and securing the fabric across the back of the inner member.

Among other objects of the present invention may be included the provision of the desired printing on the transparent or celluloid portion of the eye shell; the elimination of a ragged visible line at the edge of the printing; the simplified application of the black fabric surface at the pupil of the eye; the securing of the inner member to the shell of the eye; and others which will appear in the following more detailed description.

To the accomplishment of the foregoing and such other objects as will hereinafter appear, my invention consists in the doll's eye elements and their relation one to the other, as are hereafter described in the specification and sought to be defined in the claims. The specification is accompanied by drawings, in which:

Fig. 1 is a plan view of a sheet of celluloid showing a first intermediate stage in the printing thereof;

Fig. 2 is a similar plan view showing a second intermediate stage in the printing thereof;

Fig. 3 is a section taken through a printed sheet of celluloid;

Fig. 4 shows the same after being combined with a protective sheet of celluloid;

Fig. 5 is a perspective view of a celluloid eye shell formed from the sheet of celluloid;

Fig. 6 is a plan view of an inner or background member for the eye;

Fig. 7 is a section taken in the plane of the line 7—7 in Fig. 6;

Fig. 8 is a section taken through a finished eye constructed in accordance with the present invention; and Figs. 9 through 13 are similar sections taken through modified forms of eye also constructed in accordance with the present invention.

The eye shell includes a circular transparent portion corresponding to the iris of the eye. This is made of celluloid or similar transparent readily worked material. For the sake of simplicity I have found it desirable to make the entire eye shell out of celluloid or like material, and to provide the same with a white opaque area surrounding the transparent iris portion and simulating the eye ball itself.

The resulting eye shell is shown in perspective in Fig. 5, and comprises a generally hemispherically shaped eye shell 2, the forward looking portion of which has printed thereon a white opaque annular area 4 simulating the eye ball, and an iris portion 6 which is transparent except for a series of radially directed lines 8. This eye shell is used in combination with a button-like inner member, shown in Figs. 6 and 7. This inner member comprises an annular portion 10 the cross section of which is preferably outwardly convex, as is clearly shown in Fig. 7, and which is colored to correspond to the desired color of eye. The dark middle portion 12 of the button simulates the pupil of the eye and is colored black preferably by applying a piece of fabric 12 across the back of the button so that it is visible through the central aperture within the iris portion 10. The button is applied to the inside of the shell 2, and is affixed in place in registry with the transparent or iris portion of the shell and thus constitutes a finished eye member the arrangement of which is evident from an inspection of any of the cross sections shown in Figs. 8 through 13.

A preferred method for making the eye shell 2 is next described. Referring to Fig. 1, a thin sheet of celluloid 14, the opposite faces of which may be and preferably are left in frosted or translucent condition, has printed on one face a series of tangentially related circles 16 defining the individual eye shells, and a series of circles 18 defining the iris portion of each of the eye shells. A plurality of lines 8 are provided at the iris portion, and extend inwardly from the circles 18 in a radial direction. The lines are preferably wedge shaped, and stop short of the center of the eye so as to clear the pupil of the same. The printing is then dried.

The annular shaped opaque white portions 4 are next printed on the sheet of celluloid, as is shown in Fig. 2. This area may, of course, be made as large as desired outside of the iris portion 6, but in accordance with known practice is made only sufficiently large to amply fill the eye opening in which the eye member is subsequently to be mounted. The surrounding unprinted annular portion subsequently binds the layers permanently together better than is possible through the white paint.

The condition of the sheet of celluloid 14 at this time is clearly evident from an inspection of Fig. 3, in which the printing for the iris is shown at 8, while the printing for the eye ball is shown at 4. The latter, it should be noted, preferably overlaps the former slightly, as at 20, in order to reduce the necessary precision of registration of the first and second printing operations.

Another and preferably relatively thick sheet of celluloid 22 is next applied over the printing, so that the same is enclosed between two sheets of celluloid. This second sheet of celluloid may also be rough or frosted on both faces. The sheets of celluloid are then cemented and compressed under heat and pressure between two polished plates, thereby fusing the same together, as is shown in Fig. 4. The combined sheet is now perfectly transparent, for the frosting at the parting face 24 of the sheets is lost by reason of the sheets being fused together into a single mass, and the frosting of the outer faces 26 and 28 is eliminated because of their having been compressed between polished plates.

The printing 8 of the iris is preferably made of a relatively neutral color, such as grayish blue, and is applied in a thin coat or is of transparent ink so as to leave the same somewhat translucent. In this respect the drawings, particularly Figs. 1 and 2 thereof are misleading, for the dark appearance of the radial lines at the iris of the eye, as shown in the drawings, does not actually occur in practice. It will be noted in Figs. 3 and 4 that the coating of white paint 4 is far thicker than the coating of neutral color at 8. For this reason the edges of the white paint tend to spread and form a ragged edge when the sheets 14 and 22 of celluloid are compressed together. The overlap of white and blue color at 20 is therefore arranged with the white color in back of the blue color, so that when looking at the eye from the outside, that is, from the direction of the thin sheet of celluloid 14, the ragged edge of the white paint will tend to be concealed by the blue color. The final result is a shading of color, which closely simulates the appearance of the natural eye at the outer edge of the iris.

The composite sheet shown in Fig. 4 is next put through an automatic press equipped with an appropriate die for stamping out the individual eye shell portions defined by the circles 16 in Figs. 1 and 2, and for shaping the same into desired substantially hemispherical shape as indicated in Fig. 5. This cutting and shaping operation is one already known in the prior art, and therefore need not be described in detail.

While the printed eye shell member is preferably obtained in the manner just described, it will be understood that many variations and modifications are possible. For example, the printing may be performed on the thick sheet, and the thin sheet subsequently applied over the same. The printing may be performed on the thick sheet and thereafter be protected by a thin coating of transparent material applied in a liquid condition, instead of using another complete sheet of celluloid. For this purpose liquid celluloid or clear lacquer, or like substance, may be used. In such case the thick sheet of celluloid is preferably frosted on only one side,—the side to which the printing is applied. The opposite side is smooth and clear, and the liquid applied to the frosted side serves to change it from the translucent to the desired transparent condition. It should also be understood that while I prefer to have the thick part of the celluloid at the inside of the shell, this is so, first, merely because the celluloid may not be perfectly clear or transparent, and a thin layer will mar the color less; and second, in order to obtain a greater spacing of the inner member or button 10 of the eye from the printing itself. It will be evident that if preferred the celluloid may be used in reverse condition with the printing on the inside of the same, and with or without the addition of another sheet of celluloid or a liquid protective coating. It may also be mentioned that the iris lines may be produced by impressing indentations or scratches on the under surface of the outer celluloid coating, and without the use of printing ink.

The inner member or button 10 is made by stamping sheet material, such as sheet celluloid or sheet metal, to the desired shape, which is in the form of an annular member the cross section of which is outwardly convex. This member is painted or colored to give the desired color to the iris of the finished eye. The central perforation may be left completely open, or uncovered with any black material, and a perfect simulation of a black pupil can, in that way, be obtained. Such an effect, produced without the assistance of a black backing, is due to the fact that the interior of the doll head, in which the eye is mounted, is completely closed and therefore shaded from the light on the outside, therefore providing a perfectly dark background for the pupil.

It is preferred, however, to cover this aperture, in order to prevent the metal parts of the mounting from reflecting light through it, but where no mounting is used, as in heads with stationary eyes, or where the mounting itself is blackened, no covering of the aperture is needed. The central portion when covered is made dark, preferably black, and the surface of the same should, in accordance with my discovery, be made light absorptive or non-reflecting. I have experimented with various paints and inks, and some, of course, are better than others, but a still better form of surface, I find, is obtainable by the use of a light absorptive black fabric, such as crepe or other dull finish material. This fabric may be applied by preliminarily cementing a layer of the fabric to a layer of backing such as cardboard, indicated at 30 in Fig. 7, after which small circles of the combined fabric and paper are punched out. These circles are of proper diameter so that they may be forced into the button 10 and there held in place. The central portion of the fabric 12 is made visible through the opening in the central portion of the button, as is clearly evident in Fig. 6.

A button of desired color is selected and applied within the eye shell 2 in proper registration with the transparent or iris portion 6 of the eye shell, and while in this position is secured in place by cement or by means of a strip of fabric or other backing material cemented across the inside of the eye shell and button. The finished eye member then takes the form shown in cross section in Fig. 8. In this figure it will be understood that the substantially hemispherical eye shell 2 is made of the composite celluloid sheet previously described, and contains permanently protected within itself the white opaque surface 4 simulating an eye ball, and the relatively neutral colored portion 8 simulating the radial lines on the iris of the eye. The inner member 10 is positioned in registry with the iris opening 6 of the eye shell and is colored to give the eye the desired shade. It is important to note that the colored background for the iris of the eye is spaced rearwardly a substantial distance from the surface of the eye shell and from the radiating lines 8, thereby giving the eye an appearance of depth. This appearance is enhanced by the fact that the black pupil portion 12 of the eye is set even further away from the eye shell. Between the pupil 12 on the one hand, and the white eye ball surface 4 on the other hand, the colored iris background extends in outwardly expanding and outwardly convex curvature, for only the surface 32 of the button is visible through the iris of the eye. This surface diverges or expands outwardly in the shape of a horn, and the curvature is opposite to a simple saucer shape such as might be employed if it were simply desired to obtain rearward spacing of the background from the eye shell. This construction, I find, is exceedingly effective in lending an appearance of depth to the eye, and while I do not wish to be committed to any specific explanation of the phenomenon, the desirable result is probably due to the distinct divergence of the curved surfaces of the background and the eye shell, which divergence is clarified and emphasized by the presence on the eye shell itself of the radiating lines 8. These lines make the spacing or depth between the colored background and the eye shell readily apparent, and increase the natural appearance of the eye because of their tendency to cast a vague shadow against the colored background. The button may be secured within the eye shell in any desired manner, as by the application of a piece of fabric 34 which is cemented to the inner wall of the eye shell and to the rear edges of the button, or more simply, by direct cementing.

The doll's eye may be constructed in numerous modified forms, without departing from the spirit or essence of the present invention, and a few such modified forms will next be described, but it is to be understood that these modifications are only by way of exemplification and not limitation.

In Fig. 9 the eye shell 2 is similar to that described in Fig. 8, and is similarly provided with a white eye ball surface 4 and radiating lines 8 on the transparent iris portion 6. The inner member or button is in this case indicated at 40, and is appropriately colored and shaped to give color and depth to the eye, exactly as has already been described. The dark central or pupil portion of the eye is in this case obtained by a piece of light absorptive black fabric 42 which serves not only to surface the pupil of the eye, but which also acts as a securing member for cementing the button 40 within the eye shell 2. In this form of the invention the functions of the surfacing fabric 12 and the securing fabric 34 in Fig. 8, have been combined and are fulfilled by the single piece of fabric 42.

In Fig. 10 the eye shell 2 is again similar and is similarly provided with an eye ball portion 4 enclosing a transparent iris portion 6 which is provided with radiating lines 8. The inner or button member 44 is preliminarily provided with a fabric pupil 12 backed with paper board 30, exactly as was the case in Fig. 8. In the present form of the invention, however, the outer portion 46 of the metallic inner member or button 44 is shaped to closely mate with and fit the hemispherical surface of the eye shell 2, and furthermore, the member 44 is secured within the eye shell 2 by cementing the same directly thereto and without the use of a special securing fabric or similar device. Direct cementing, preferably with transparent cement, may also be used in the form shown in Fig. 8.

The form of the invention shown in Fig. 11 is quite similar to that shown in Fig. 10, except that in this case the outer walls 46 of the inner member are extended rearwardly, as shown at 48, to take the shape of and entirely fill the shell 2. The significance of this form of the invention may not seem entirely clear from a casual inspection of Fig. 11, but it should be remembered that in practice numerous forms of mounting means are used for mounting the eye shell on an appropriate cross rod and supporting means therefor, and for yieldingly urging the eye member into engagement with the eye opening or eye socket of the doll. The metallic skirt 48, provided on the inner member, may be used in connection with such mounting means. Also, the inner member may be secured to the shell without cementing the same in place, if desired, by providing appropriate tongues on the inner member which cooperate with slots or openings in the eye shell; and finally it should be kept in mind that if desired the transparent or celluloid portion of the eye shell may be reduced in area so as to not extend far beyond the white opaque portion 4, for example, and the metal skirt 48 alone used for mounting the eye shell on appropriate mounting means.

The form of the invention shown in Fig. 12 is somewhat similar to that shown in Fig. 11, except that in this case a coating of black paint or ink 50 is used for the pupil of the eye, instead of a fabric surface. The preferably metal inner member 52 is shaped much like the inner member of Fig. 11, except that no central aperture is cut through the same, but instead a continuous wall 54 is provided, the pupil portion of which is bent, as shown, to form a cup or crater in which any desired form of dark or black surfacing may be placed, as for example, a drop of relatively non-reflecting ink or paint. In connection with this form of the invention, it should of course be appreciated that a small metal button may be used for the inner member, just as was the case in Figs. 8 and 10, the only change being that the pupil portion of the button is depressed and painted, instead of being apertured and backed with fabric. It may also be mentioned that a small bit of black fabric or like material may be applied at 50, in Fig. 12, in order to properly surface the same, but when fabric is used, it is far better to place the same in back of the pupil opening, in the manner shown in Figs. 8 through 11, because of the clean, perfect, circular definition given to the pupil portion of the eye, and because any fraying or irregularities at the edges of the fabric are completely concealed by the iris portion of the inner member.

In Fig. 13 the eye shell 60 consists of only a single layer of celluloid the rear face of which has applied thereto the white opaque background 4 and the radiating iris lines 8. The painted surfaces may, if desired, be protected by a coating of transparent liquid applied over the same. The inner member may resemble any of the forms previously described, and be applied within the shell 60 in similar fashion. A somewhat similar type of eye may be made, in which the printing is performed on the outer surface of a single sheet of celluloid, and the same is thereafter coated with a transparent liquid. The form shown in Fig. 13 is better, in more securely protecting the printed surface against wear from the outside, but is inferior in that the spacing rearwardly between the printed surface of the eye shell and the background of the eye is reduced.

Some forms taken by and the mode of constructing the preferred types of eye of my invention, and the many advantages thereof will, it is thought, be apparent from the foregoing description thereof. The provision of radial lines on the iris is simplified to a mere printing operation instead of cutting or scoring into the transparent surface, and this printing operation may be performed just before or after the printing operation which provides the opaque white background for the eye ball. The finished eye is characterized by a transparency and depth which rivals that of the very best types of glass eye. A single cutting and shaping operation performed on readily worked material like celluloid, provides not only the transparent portion of the eye but also the complete eye shell. Various colors of eye may be obtained simply by changing the color of the inner member of the eye and without at all altering the outer shell of the eye. The dark central or pupil of the eye is made fully light absorptive, and no unnatural glare or reflection from this part of the eye can take place. The eye consists essentially of only two simple elements,—the eye shell and a small inner member or button which is readily secured within the eye shell in any desired manner.

It will be apparent that while I have shown and described my invention in the preferred forms, many changes and modifications may be made in the structures disclosed, without departing from the spirit of the invention, defined in the following claims.

I claim:

1. A doll's eye comprising a shell having a transparent portion corresponding to the iris of the eye, said transparent portion being provided with iris lines and with an appropriately colored background, both being visible through the transparent portion of the shell, but said colored background being spaced rearwardly a substantial distance from the iris lines in order to create an appearance of depth in the eye.

2. A doll's eye comprising a shell having a circular portion made of transparent material and corresponding to the iris of the eye, said circular portion being provided with radial lines, an appropriately colored annular background, and a dark central pupil, all being visible through the transparent portion of the shell, but said colored background and pupil being spaced rearwardly a substantial distance from the radial lines in order to creat an appearance of depth in the eye.

3. A doll's eye comprising an eye shell having a transparent area corresponding to the iris of the eye and provided with radial lines, and an inner member mounted within the eye shell and appropriately colored to represent the iris of the eye, said colored iris member being spaced rearwardly from the shell member with its radial lines.

4. A doll's eye comprising an eye shell provided with a white opaque area representing the eye ball and surrounding a transparent area corresponding to the iris of the eye, said transparent area being provided with radial lines, and an inner member mounted within the eye shell and including an appropriately colored surface representing the iris and a black central portion representing the pupil of the eye, said iris and pupil being spaced rearwardly from the shell member with its radial lines.

5. A doll's eye comprising an eye shell of transparent material, said eye shell having printed thereon a white opaque area representing the eye ball and surrounding a transparent area corresponding to the iris of the eye, said transparent area being printed with radial lines of a relatively neutral color, and an inner member mounted within the eye shell and including an appropriately colored surface representing the iris and a black central portion representing the pupil of the eye, said iris and pupil being spaced rearwarly from the shell member with its radial lines.

6. A doll's eye comprising a substantially hemispherically shaped eye shell made of transparent celluloid, said eye shell being provided with a white opaque area representing the eye ball and surrounding a transparent area corresponding to the iris of the eye, said transparent area being provided with wedge shaped lines extending radially inward from its periphery, and an inner member mounted within the eye shell and including an appropriately colored surface representing the iris and a black central portion representing the pupil of the eye, said iris and pupil surfaces being spaced rearwardly a substantial distance from the shell member with its radial lines, in order to create an appearance of depth.

7. A doll's eye comprising an eye shell having a transparent central portion, and an inner member affixed within the shell behind the transparent portion, said inner member including a dark central portion set a substantial distance rearwardly of the shell and simulating the pupil of the eye, and an annular colored portion simulating the iris of the eye and extending forwardly and outwardly from the pupil to the periphery of the transparent portion with an outwardly convex expansion.

8. A doll's eye comprising an eye shell having a transparent central portion, and an inner member affixed within the shell behind the transparent portion, said inner member including an annular iris portion of outwardly convex section appropriately colored to simulate the iris of the eye, and a dark central portion simulating the pupil of the eye, the outwardly convex section of the iris portion of the inner member being shaped to give the colored iris background a curvature which diverges inwardly away from the eye shell and toward the rearwardly disposed pupil of the eye.

9. A doll's eye comprising an eye shell having a transparent central portion, an annular colored iris background, and a central background portion simulating the pupil of the eye, said central portion being surfaced with a dark colored light absorbing fabric, in order to prevent unnatural reflection of light from the pupil of the eye.

10. A doll's eye comprising an eye shell having a transparent central portion, and an inner member affixed within the shell behind the transparent portion, said inner member including an annular iris portion of outwardly convex section appropriately colored to simulate the iris of the eye, and a central portion simulating the pupil of the eye and surfaced with a dark non-reflecting fabric, the outwardly convex section of the iris portion of the inner member being shaped to give the colored iris background a curvature which diverges inwardly away from the eye shell and toward the pupil of the eye.

11. A doll's eye comprising a substantially hemispherically shaped shell made of transparent celluloid, and an inner member affixed within the shell, said inner member being made of metal and including an annular iris portion of outwardly convex section appropriately colored to simulate the iris of the eye, and a central portion simulating the pupil of the eye and having a lamination of black fabric secured in place behind a central aperture within the iris portion of the inner member, the outwardly convex section of the iris portion of the inner member being shaped to give the colored iris background a curvature which diverges inwardly away from the eye shell and toward the pupil of the eye, which consequently is located a substantial distance rearwardly from the eye shell, whereby an appearance of depth is created in the eye.

12. A doll's eye comprising an eye shell having a transparent area corresponding to the iris of the eye and having printed thereon radial lines, and an inner member affixed within the shell behind the transparent portion, said inner member including a dark central portion set a substantial distance rearwardly of the shell and simulating the pupil of the eye, and an annular colored portion simulating the iris of the eye and extending forwardly and outwardly from the pupil to the periphery of the transparent portion with an outwardly convex expansion.

13. A doll's eye comprising an eye shell of transparent celluloid having printed thereon a white opaque area representing the eye ball and surrounding a transparent area corresponding to the iris of the eye, said transparent area being printed with radial lines of a relatively neutral color, and an inner member affixed within the shell, said inner member including an annular iris portion of outwardly convex section appropriately colored to simulate the iris of the eye and a dark central portion simulating the pupil of the eye, the outwardly convex section of the iris portion of the inner member being shaped to give the colored iris background a curvature which diverges inwardly away from the eye shell with its radial lines and toward the pupil of the eye.

14. A doll's eye comprising an eye shell having a transparent area corresponding to the iris of the eye and provided with radial lines, and an inner member affixed within the shell, said inner member including an annular iris portion of outwardly convex section appropriately colored to simulate the iris of the eye and a dark central portion simulating the pupil of the eye, the outwardly convex section of the iris portion of the inner member being shaped to give the colored iris background a curvature which diverges inwardly away from the eye shell and toward the rearwardly disposed pupil of the eye.

15. A doll's eye comprising an eye shell of transparent material, said eye shell being provided with a white opaque area representing the eye ball and surrounding a circular transparent area corresponding to the iris of the eye, and an inner member affixed within the shell, said inner member including an annular iris portion of outwardly convex section appropriately colored to simulate the iris of the eye and a dark central portion simulating the pupil of the eye, the outwardly convex section of the iris portion of the inner member being shaped to give the colored iris background a curvature which diverges inwardly away from the eye shell and toward the rearwardly disposed pupil.

16. A doll's eye comprising an eye shell of transparent material, said eye shell being provided with a white opaque area representing the eye ball and surrounding a transparent area corresponding to the iris of the eye, said transparent area being provided with radial lines, and an inner member affixed within the shell, said inner member including an annular iris portion of outwardly convex section appropriately colored to simulate the iris of the eye, and a dark central portion simulating the pupil of the eye, the outwardly convex section of the iris portion of the inner member being shaped to give the colored iris background a curvature which diverges inwardly away from the eye shell with its radial lines and toward the rearwardly disposed pupil of the eye.

17. A doll's eye comprising an eye shell of transparent material, said eye shell being provided with a white opaque area representing the eye ball and surrounding a transparent area corresponding to the iris of the eye, said transparent area being provided with radial lines, an annular colored iris background, and a central background portion simulating the pupil of the eye, said central portion being surfaced with a dark colored light absorbing fabric, in order to prevent unnatural reflection of light from the pupil of the eye.

18. A doll's eye comprising an eye shell of transparent material, said eye shell being provided with a white opaque area representing the eye ball and surrounding a transparent area corresponding to the iris of the eye, said transparent area being provided with radial lines, and an inner member affixed within the shell, said inner member including an annular iris portion of outwardly convex section appropriately colored to simulate the iris of the eye and a central portion simulating the pupil of the eye and surfaced with a dark non-reflecting fabric, the outwardly convex section of the iris portion of the inner member being shaped to give the iris background a curvature which diverges inwardly away from the eye shell with its radial lines and toward the pupil of the eye.

19. A doll's eye comprising a substantially hemispherically shaped eye shell of transparent celluloid, said eye shell being provided with a white opaque area representing the eye ball and surrounding a circular transparent area corresponding to the iris of the eye, said transparent area being provided with wedge shaped lines extending radially inward from the periphery thereof, and an inner member affixed within the shell, said inner member being made of metal and including an annular iris portion of outwardly convex section appropriately colored to simulate the iris of the eye and having a central aperture, and a dark central portion simulating the pupil of the eye, said central portion having a lamination of black fabric secured in place behind the central aperture of the iris portion of the inner member, the outwardly convex section of the iris portion of the inner member being shaped to give the colored iris background a curvature which diverges inwardly away from the eye shell with its radial lines and toward the pupil of the eye, which in turn is located a substantial distance rearwardly from the eye shell with its radial lines, whereby an appearance of depth is created in the eye.

20. A doll's eye comprising an eye shell of substantially uniform thickness having an outer transparent area corresponding to the iris of the eye and provided with radial lines, and an inner member appropriately colored to represent the iris of the eye, said colored iris member being spaced rearwardly of said radial lines.

21. A doll's eye comprising an eye shell having a transparent area corresponding to the iris of the eye and provided with radial lines and a member simulating the pupil of the eye arranged inwardly of the said transparent area and rearwardly of said radial lines.

22. A doll's eye comprising an eye shell having an outer transparent area corresponding to the iris of the eye and provided with radial lines, an inner member appropriately colored to represent the iris of the eye, and a member simulating the pupil of the eye, said colored iris member and said pupil member being spaced rearwardly of said radial lines.

23. A doll's eye comprising an eye shell having an outer transparent area corresponding to the iris of the eye and provided with radial lines and an inner member appropriately colored to represent the iris of the eye, said colored iris member being spaced rearwardly of said radial lines and provided with a central aperture coincident with the pupil of the eye.

24. A doll's eye comprising a shell having a circular portion made of transparent material and corresponding to the iris of the eye, said circular portion being provided with radial lines, an appropriately colored annular background having a central aperture coincident with a simulated pupil, all being visible through the transparent portion of the shell, but said colored background and pupil being spaced rearwardly a substantial distance from the radial lines in order to create an appearance of depth in the eye.

25. A doll's eye comprising a generally hemispherical main eye shell and a generally circular auxiliary member, said main eye shell being formed of transparent material of a uniform thickness sufficient to make the shell rigid and self supporting in shape, and being provided with a white opaque area representing the eye ball and surrounding a transparent circular area corresponding to the iris of the eye, and said auxiliary member being a relatively small separate inner member having an over-all diameter approximately equal to the diameter of the transparent circular area of the eye shell and mounted within and supported by the eye shell and substantially localized in the immediate vicinity of the aforesaid transparent circular area, said inner member including an appropriately colored annular surface representing the iris and a black central portion representing the pupil of the eye, said pupil and at least a portion of said iris surface being spaced rearwardly a substantial distance from the shell member in order to create an appearance of depth in the eye.

26. A doll's eye comprising a main eye shell and an auxiliary inner member, said main eye shell being generally hemispherical and formed of transparent celluloid material of a uniform thickness sufficient to make the shell rigid and self supporting in shape, said eye shell being painted with a white opaque area representing the eye ball and surrounding a transparent circular area corresponding to the iris of the eye, said transparent area being offset from the center of the surface of the eye shell toward one side thereof, and said auxiliary member being a relatively small separate generally circular inner member having an over-all diameter approximately equal to the diameter of the transparent circular area of the eye shell and mounted within and supported by the eye shell and substantially localized in the immediate vicinity of the aforesaid transparent circular area, said inner member including an appropriately colored annular surface representing the iris and a black central portion representing the pupil of the eye, said iris and pupil surfaces being spaced rearwardly a substantial distance from the shell member in order to create an appearance of depth in the eye.

LEO J. GRUBMAN.